US005513555A

United States Patent [19]

Plank et al.

[11] Patent Number: 5,513,555

[45] Date of Patent: May 7, 1996

[54] QUICK-RELEASE CAM LOCK WITH LOCKING PIN

[75] Inventors: Michael J. Plank, 3114 Long Bay Ct., Houston, Tex. 77059; Victor M. Cerda; Fred B. Plummer, both of Houston, Tex.

[73] Assignee: Michael J. Plank, Houston, Tex.

[21] Appl. No.: 184,873

[22] Filed: Jan. 21, 1994

[51] Int. Cl.[6] .............................. F15B 15/26; E02D 3/02; F16J 1/00

[52] U.S. Cl. .................................... 92/19; 92/30; 254/30; 254/134; 405/282

[58] Field of Search .................................... 92/18, 19, 23, 92/30; 254/29 R, 30, 93 R, 133 R, 134; 405/272, 282, 290

[56] References Cited

U.S. PATENT DOCUMENTS

| | | | |
|---|---|---|---|
| 360,183 | 3/1887 | Wallace | 254/93 R |
| 792,626 | 6/1905 | Stephens | 285/320 X |
| 982,023 | 1/1911 | Sands | 254/29 R |
| 2,274,304 | 2/1942 | Perry | 92/30 X |
| 2,567,390 | 9/1951 | Mead | 92/30 |
| 2,917,277 | 12/1959 | Pine | 92/19 |
| 2,967,044 | 1/1961 | Corcreham et al. | 254/30 |
| 3,224,201 | 12/1965 | Brunton . | |
| 3,321,182 | 5/1967 | Elenburg . | |
| 3,335,573 | 8/1967 | Ward . | |
| 3,584,541 | 6/1971 | Cunningham | 92/30 X |
| 3,766,740 | 6/1972 | Teegen . | |
| 3,851,856 | 5/1972 | Berg | 254/93 R |
| 3,905,279 | 9/1973 | Yadon . | |
| 4,247,082 | 5/1979 | Sjolund . | |
| 4,449,734 | 7/1982 | Cory . | |
| 4,682,914 | 7/1987 | Aihara et al. . | |
| 4,787,781 | 5/1987 | Bradberry . | |
| 4,957,193 | 9/1990 | Tamamori | 92/19 X |
| 5,096,334 | 3/1992 | Plank . | |

FOREIGN PATENT DOCUMENTS

| | | | |
|---|---|---|---|
| 1459090 | 10/1982 | Japan . | |
| 27668 | 12/1906 | United Kingdom | 92/19 |
| 1603025 | 11/1981 | United Kingdom | 405/290 |
| 2095719 | 10/1982 | United Kingdom . | |

*Primary Examiner*—Edward K. Look
*Assistant Examiner*—John E. Ryznic
*Attorney, Agent, or Firm*—J. Albert Riddle; Matthews & Associates

[57] ABSTRACT

A quick-release cam lock for selectively locking the relative position of a hydraulic cylinder and a piston. The quick-release cam lock permits speedy unlocking and repositioning of the hydraulic cylinder and its accompanying piston, thus allowing for speed in repositioning, assembly or disassembly while also providing a secure positive positioning lock between the hydraulic cylinder and the piston while the quick-release cam lock is engaged. A locking pin selectively locks the cam lock in an opened position.

15 Claims, 5 Drawing Sheets

QUICK-RELEASE CAM LOCK WITH LOCKING PIN

FIELD OF THE INVENTION

The present invention relates generally to devices for protecting workers doing any type of work in excavations such as below ground repairs, maintenance or installation of any type such as trenching, bore pits, manhole installations, or pipe line maintenance work. More particularly this invention relates to a new and improved way for locking or fixing the position of hydraulic cylinders used in the trench shoring industry and elsewhere hydraulic cylinders in general.

BACKGROUND OF THE INVENTION

Presently available excavating equipment permits digging rapidly so that excavation work can be done and the excavation immediately filled. However, installations which require personnel to enter into the excavation (which can be rather deep and through unstable soil) have the potential for cave-ins. Such cave-ins of the excavation not only interfere with the maintenance or construction operations, but also may cause serious injury or even loss of life to working personnel. There are various types of devices at this time in the field which are utilized in these maintenance and construction trenches or excavation shoring operations to support be placed against the walls of the excavation. Samples of shoring devices generally known in the field include shoring shields, skeleton boxes, walers, vertical shores and four way manhold braces.

The various types of shoring devices generally incorporate hydraulic cylinder arrangements which are used for shoring the sides of trenches or excavations. It is common for devices such as these to utilize one or more horizontally disposed vertically spaced hydraulic cylinder/piston units that are connected at their opposite ends to shoring rails which extend vertically and which will be held against the opposite sides of the trench when the hydraulic cylinder/piston units are expanded. Another common shoring device uses one or more horizontally disposed, horizontally spaced, hydraulic cylinder and piston units connected pivotally at their opposite ends to horizontal shoring rails which butt against the excavation walls, shoring timbers or sheeting which may be vertically disposed at the opposite sides of the trench. Each of these types of shoring devices operate so that the cylinder and piston units act as cross-braces extending across the trench. Once the shoring devices are inserted into the trench, hydraulic fluid is pumped into the cylinders to force the pistons to extend and thereby to jack the shoring rails apart to the desired extent, and thereby hold the shoring rails or shoring boards tightly against the opposite walls of the trench to prevent sloughing of the material behind the boards or to prevent such dangers as cave-ins.

Currently, there exists various types of hydraulic jacking units which are provided with assorted positive supporting mechanisms to lock the jack into extended position and to fix the relative position of the piston and cylinder units so as to prevent retraction of the piston into the cylinder even in the event of pressure loss or release from the cylinder. Such devices generally utilize either a pin, as disclosed in U.S. Pat. Nos. 4,682,914 to Aihara; 3,224,201 to Brunton; 3,851,856 to Berg; and U.K. Patent No. 2,095,719, or a threaded piston with a locking screw, as disclosed in U.S. Pat. Nos. 3,905,279 to Yandon; 4,787,781 to Bradberry; 3,766,740 to Teegan; 4,449,734 to Cory; 3,321,182 to Elenberg; 4,247,082 to Siolund and Japanese Patent No. 1,459,090.

Unfortunately, the above referenced devices generally fail to provide for rapid and simple operator activation and engagement positioning during set up, operation, and breakdown of the shoring device and additionally fail to provide for the flexibility of linear locking. Further, the prior art devices often allow for exposed threads, where threads are used, as part of the positioning or locking mechanism utilized with the shoring device, such threads being easily damaged and clogged with dirty, concrete or other foreign matter which is often utilized in conjunction with trenching operations. Still further, these devices can be properly locked only after the device is in the trench, whereas the present invention provides the alternative of linear locking prior to placing the shoring device or hydraulic cylinder into a trench or other end use location.

Accordingly, the quick-release cam lock of the present invention provides a means for quickly and easily locking a hydraulic cylinder/piston arrangement at any desired width by means of a positive locking cam mechanism while also providing for a quick-release mechanism for ease of operability during repositioning of the hydraulic cylinder/piston arrangement. Notwithstanding the various devices referred to above, various other problems associated with devices for preventing the retraction of the piston into the cylinder, even in the event of pressure loss or release from the cylinder, are solved in the new and improved quick-release cam lock for hydraulic cylinders of the present invention.

SUMMARY OF THE INVENTION

The present invention provides a mechanism to positively lock the relative positions of a hydraulic cylinder and its piston in a shoring device and to prevent collapse in the event of a hydraulic cylinder failure or leakage. Slight compressive movement can occur but this merely further engages cam against the piston rod by enhancing the locking engagement between the two. Additionally, the present invention provides a means for quickly releasing such locking mechanism to allow for a speedy readjustment of the relative position of the hydraulic cylinder to the piston.

The present invention provides a mechanism or device for selectively locking the relative position of a piston in relation to a hydraulic cylinder and preventing any compressive movement between the hydraulic cylinder and the piston. The present invention additionally provides for a means of quickly releasing such locking mechanism in the event of any necessary repositioning of the hydraulic cylinder and piston arrangement.

A significant advantage of the present invention is that it allows for simple control of the engagement and disengagement of the locking mechanism, thus allowing for quick setup, repositioning, or breakdown of a shoring device while also providing a positive lock to the position of the hydraulic cylinder in relation to its piston to insure against possible collapse of the shoring device. A further advantage of the present invention is that it allows the locking device to be in either an engaged position, a disengaged position; or released intermediate position in which movement is permitted linearly in one direction but is restricted in the other direction.

These and other features and advantages of the present invention will be more readily apparent and more fully appreciated upon reading the following description of a preferred exemplified embodiment to the invention and upon reference to the accompanying drawings herein.

Figure 2:
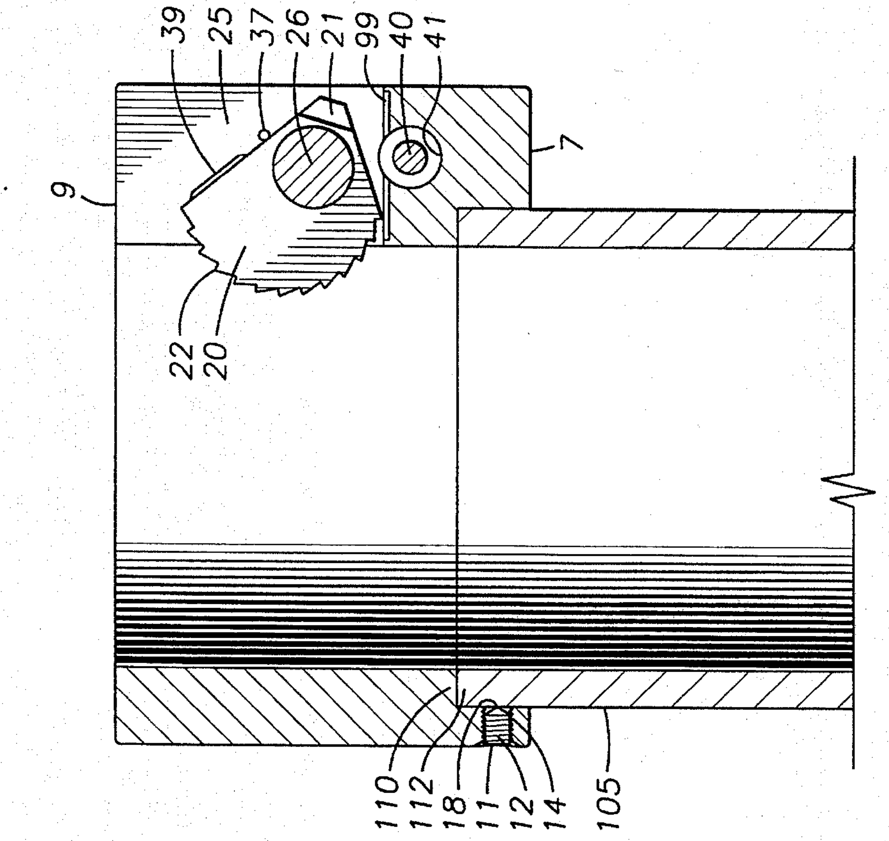
FIG. 2. is a cross-sectional view of the quick-release cam lock and hydraulic cylinder of FIG. 1.
Figure 1:
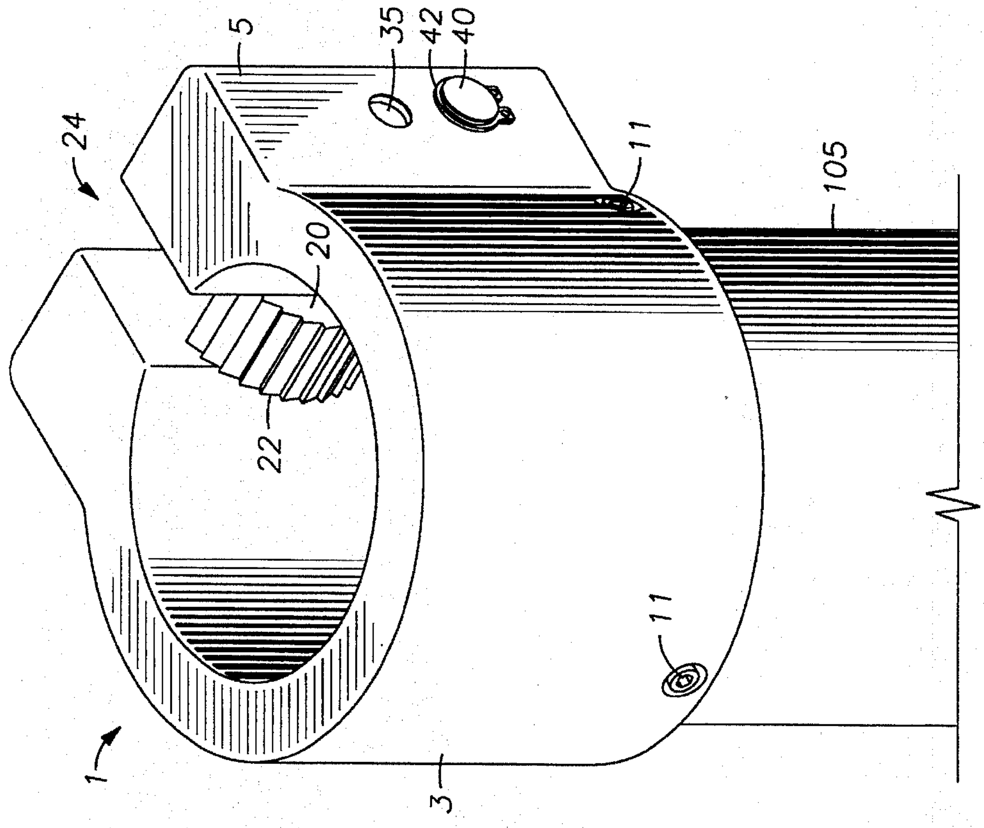
FIG. 1 is a perspective view showing the quick-release cam lock of the present invention mounted against a hydraulic cylinder.

While the invention will be described and disclosed in connection with certain preferred embodiments and procedures, it is not intended to limit the invention to those specific embodiments, rather it is intended to cover all such alternative embodiments and modifications as falls in the spirit and scope of the invention.

DETAILED DESCRIPTION OF THE PREFERRED EMBODIMENT

The preferred embodiment of the quick-release cam lock of the present invention is shown in FIG. 1 through FIG. 8, wherein the quick-release cam lock is displayed in different positions relative to a hydraulic cylinder and piston.

The preferred embodiment of the present invention includes a an extruded substantially tubular body 1 having a substantially cylindrical section 3, a substantially rectangular housing of section 5, a substantially planer mounting face 7, and a substantially planer back face 9. The tubular body 1 may rest or ride on a piston 100 and may be demountably coupled to a hydraulic cylinder 105 by means of at least one, a plurality in the present invention, cone headed locking screws 11 in the tubular body 1. A threaded channel 14 is depicted and corresponds to the screws 11. The locking screws 11 contain threads 12 which threadably engage threaded channel 14 which is designed to receive said screw 11. The end portion 16 of locking screws 11 may engage the hydraulic cylinder 105 at 18 and preferably are of the recessed Allen type.

Figure 4:
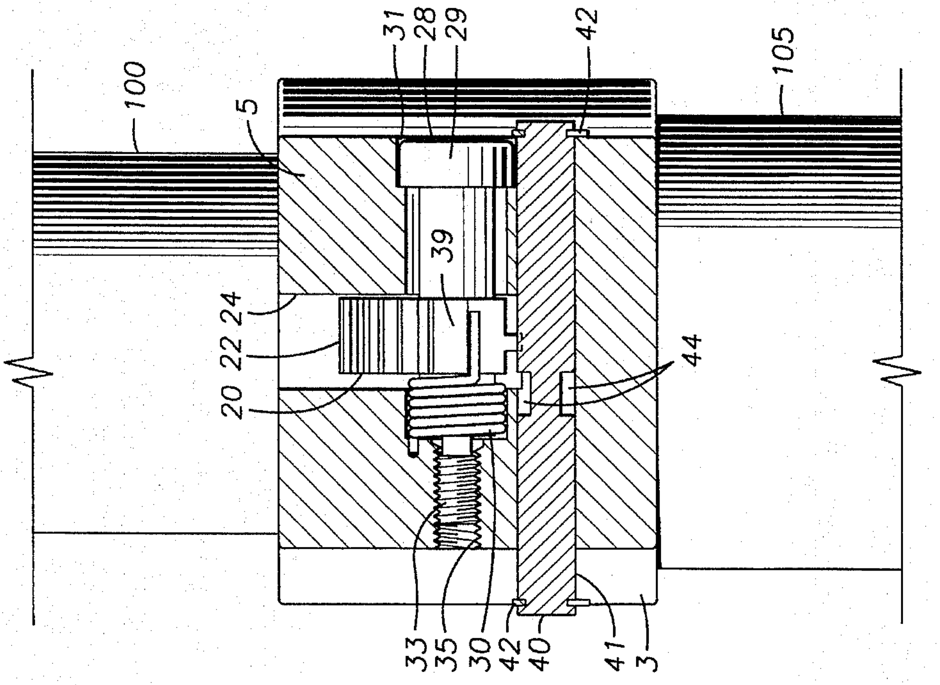
FIG. 4 is a cross-sectional view of the present invention displaying the coil spring and cam arrangement, showing the cam in its "disengaged" position.

In order to perform its described functions, the quick-release cam lock of the present invention has a cam 20 with a camming surface 21, said camming surface containing a plurality of teeth 22. The cam 20 is pivotally mounted within a slot 24 centered in the rectangular housing section 5 of tubular body 1. The cam 20 is pivotally mounted on a high-strength shaft 26 which extends through the tubular body 1. The pivotable mounting is accomplished by extending the cam shaft 26 through cylindrical opening 25 within the cam 20. Cam 20 is substantially triangular as shown with the camming surface 21 located along the hypotenuse semicircular arrangement. Preferably the shaft 26 will be set into and threadably engage the tubular body 1 by means of a recessed screw bolt 28 as shown in FIG. 4. The recessed screw bolt 28 contains a head 29 which rests within a corresponding recess 31 in the housing section 5 of tubular body 1. Extending from said head portion 29 is shaft 26 which contains threads 33 and a portion of the shaft 26 opposite screw bolt head 29. The threads 33 engage the threaded channel 35 within the portion of rectangular housing section 5 opposite channel 24 designed to receive the threads of 33 of recessed screw bolt 28.

Also mounted about the shaft 26 is a biasing means such as a coil spring 30 which is set in a recessed portion 10 of the tubular body 1 and engages at one end 36 the tubular body 1 and at the other end 37 the cam 20. The coil spring 30 provides rotatable tension on the cam 20 so that the cam 20 selectively engages the piston 100. This is accomplished by the engagement of spring end 37 against cam abutment pad 39 which is integrally attached to cam 20. By utilizing the biasing means the effective gravities is counteracted so that no matter the position of the invention as mounted the cam will always be correctly and appropriately biased.

Figure 5:
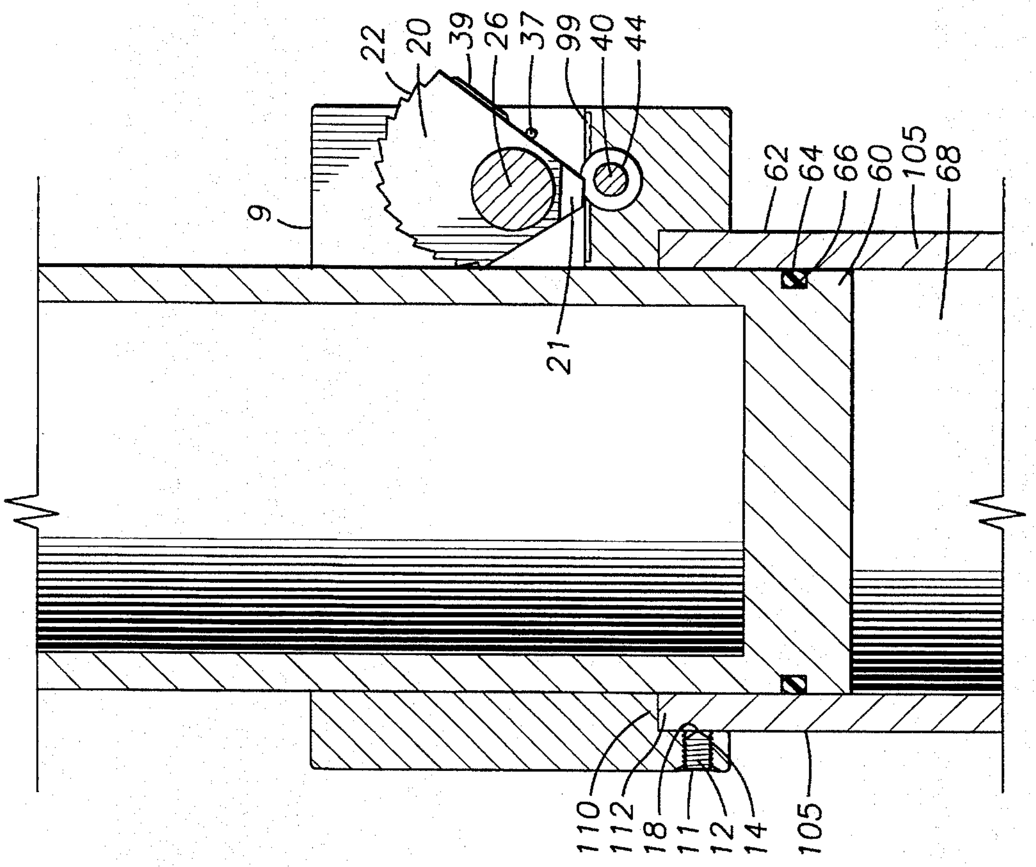
FIG. 5 is a cross-sectional view of the present invention, similar to FIG. 3, showing the cam in an "activated" position and engaging the piston.
Figure 8:
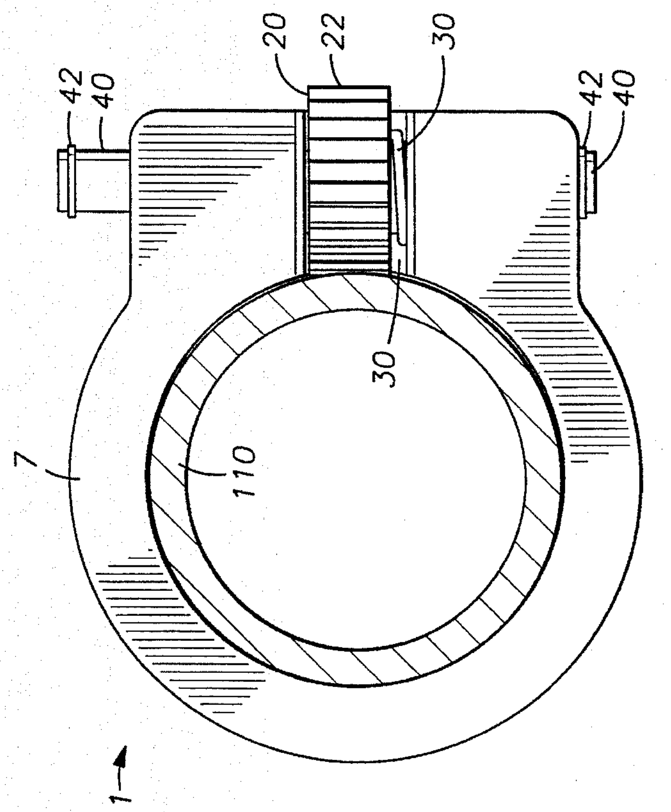
FIG. 8 is a facial plan view showing the quick-release cam lock.
Figure 7:
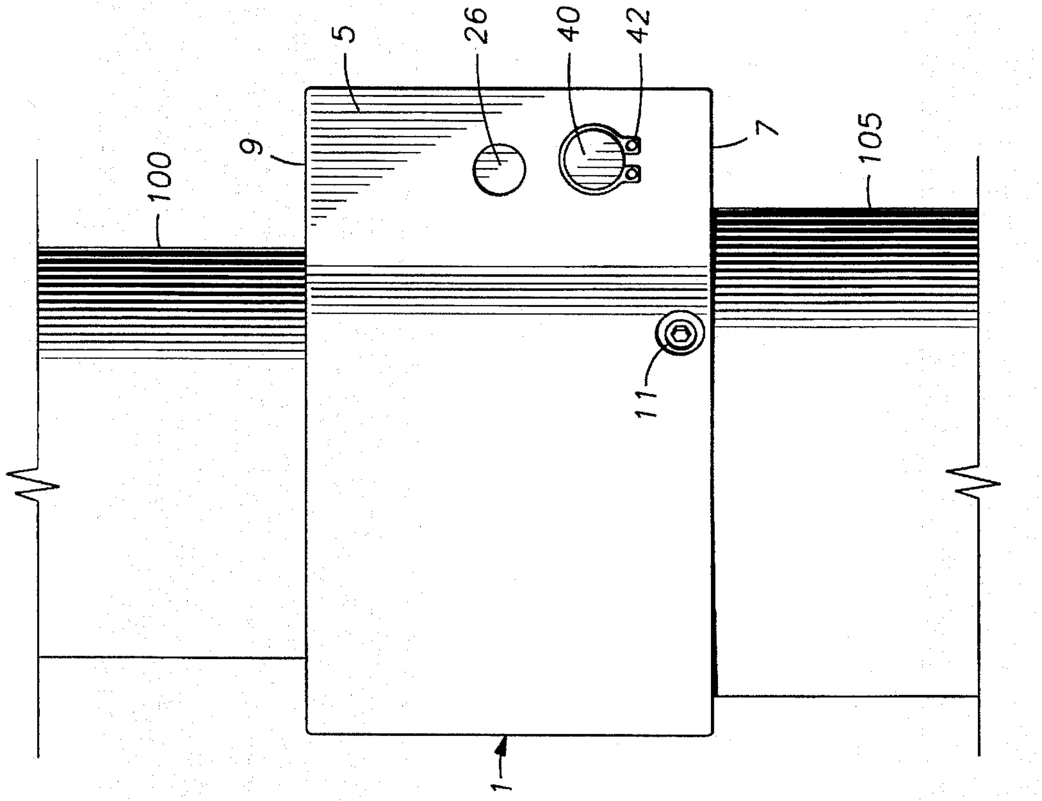
FIG. 7 is a plan view showing the quick-release cam lock mounted on a hydraulic cylinder and engaging the surface of a piston.
Figure 9:
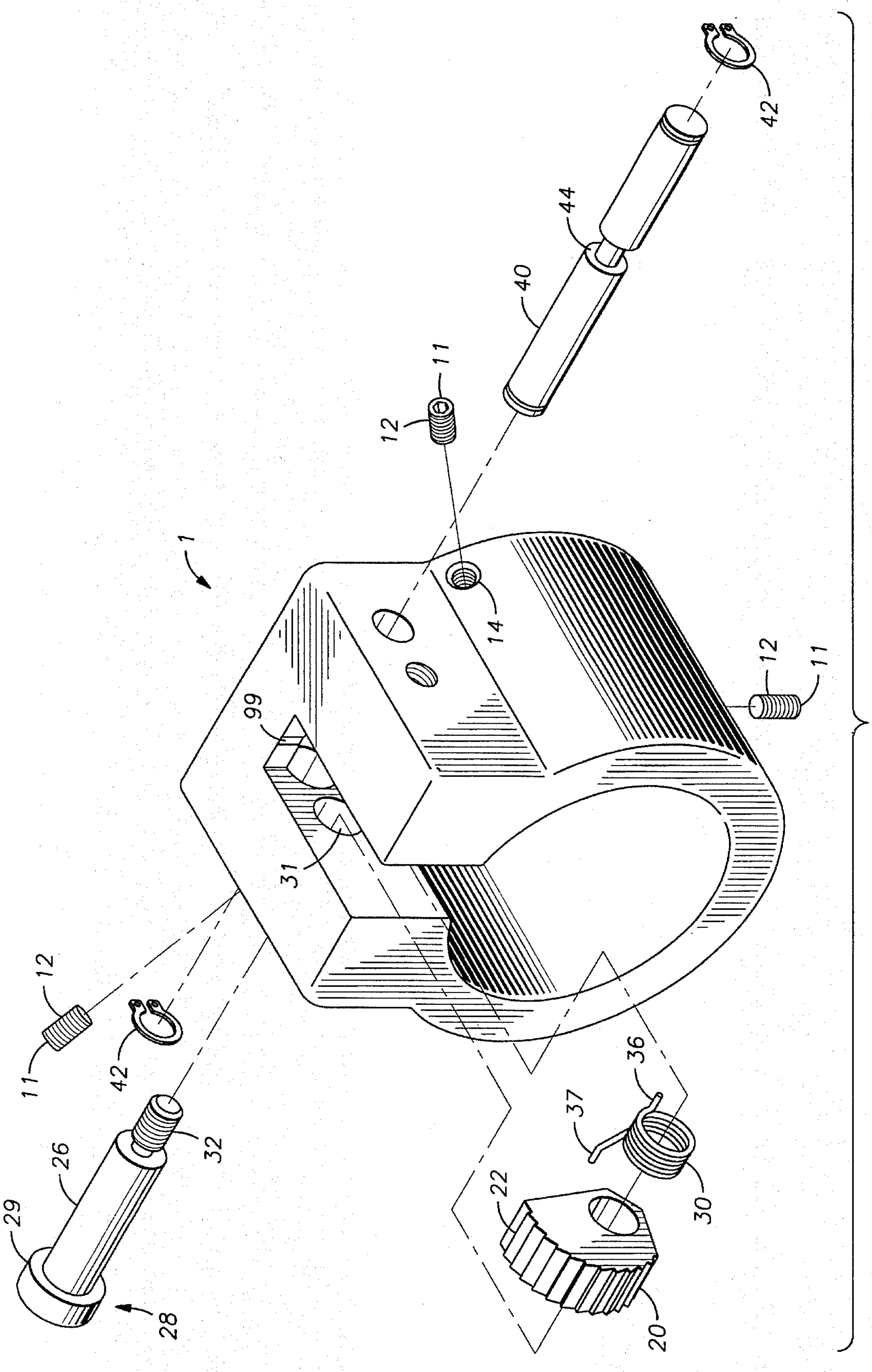
FIG. 9 is an exploded view of the preferred embodiment of the present invention.

To provide a two-position selectively engageable and releasable locking mechanism, the cam is provided with an integrally formed camming service 21 which may selectively either pass through or engage the locking pin 40. The locking pin 40 passes through by virtue of aperture 41 and is slightly longer than the rectangular section 5 of the tubular body 1. The locking pin 40 extends through a portion of channel 24. Locking washers 42 are fixably mounted on each longitudinal end of the locking pin 40 and the locking pin 40 includes a radial groove 44 through which the tail 21 of the cam 20 may pass when the locking pin 40 is in its released position as shown in FIG. 5. A slit 99 is also provided in the bottom of the channel 24 of the tubular body 1 so as to provide clearance for the tail 21 of the cam 20.

Figure 3:
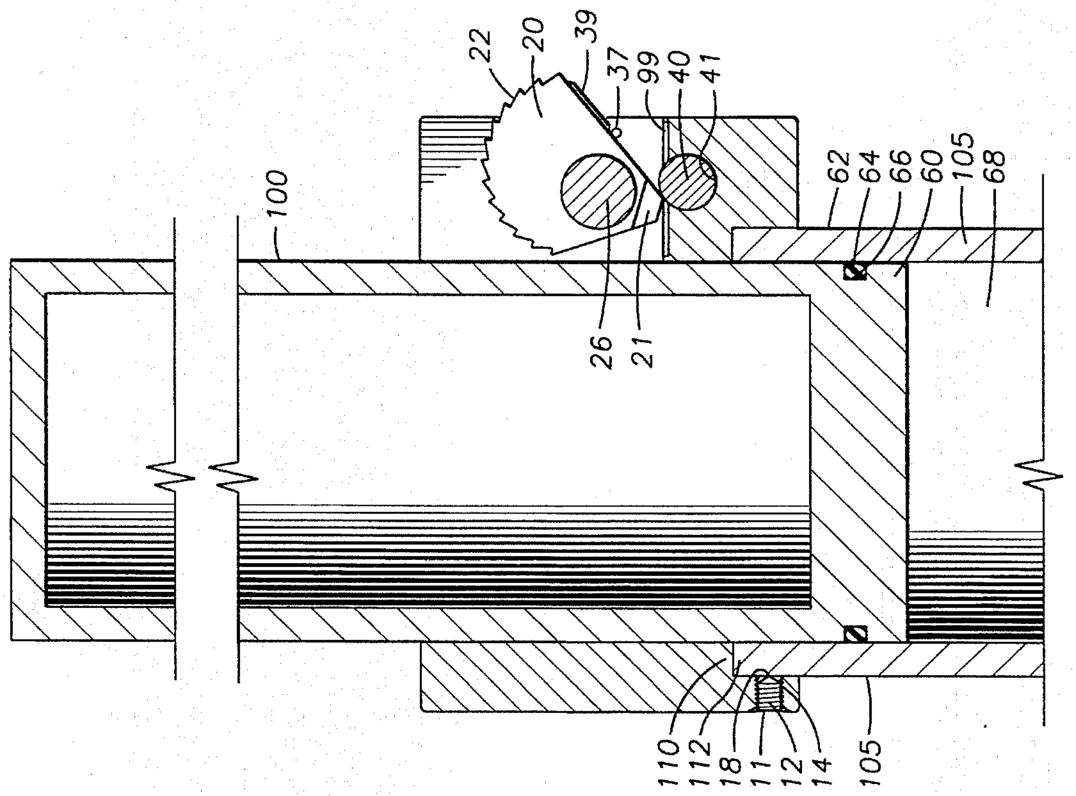
FIG. 3. is a cross-sectional view of the present invention illustrating the cam in a "disengaged" position for receiving a piston.
Figure 6:
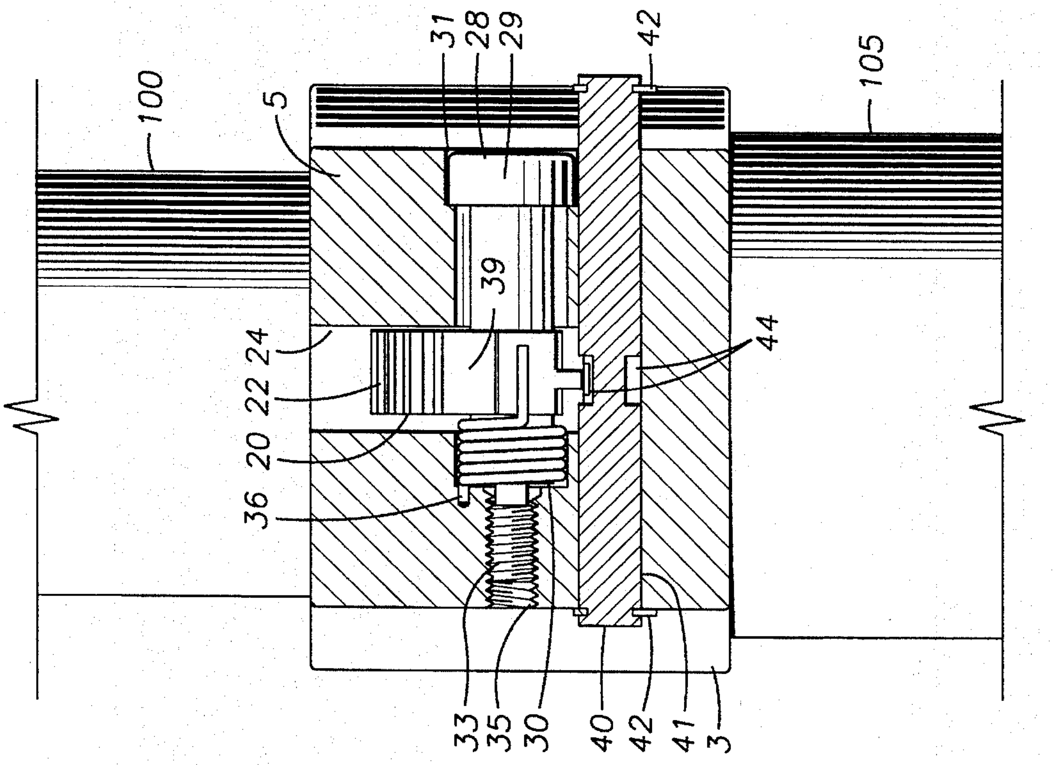
FIG. 6 is a cross-sectional view of the present invention showing the coil spring and cam of the quick-release cam lock in the "released" position.

As shown in the drawings, the cam 20 may either be in an "engaged" position wherein the locking pin is in a "closed" position, a "disengaged" position, as shown in FIG. 3, wherein the locking pin 40 is in a "closed" position preventing the engagement of the cam 20 with the piston 100, or in an engaged position as shown in FIG. 5, wherein the locking pin 40 is released in an open position so that the tail 21 of the cam 20 aligns with and passes through the radial groove 44 in the locking pin 40. In the "engaged" position, the locking pin 40 will prevent movement of the cam 20 beyond the point wherein the teeth 22 of the cam engage the piston 100. The teeth are designed so as to angle into the piston 100. That is, teeth 22 are angled such that linear movement of the piston 100 out of said cylinder 105 will be readily tolerated but linear movement of the piston 100 into said cylinder 105 will cause the teeth 22 to positively engage piston 100, preventing any further such movement. This will lock the cam onto the piston 100 and prevent any movement of the piston 100 in relation to the hydraulic cylinder 105. The Piston 100 is placed in motion by virtue of hydraulic pressure being applied to the piston head 60. The piston head 60 is affixed to piston 100 at 62. The affixation of 60 to 100 can be by threaded engagement, welding, or any other suitable method. The piston head 60 normally contains at least one seal 64. The seal or seals are preferably placed within radial grooves 66 in the piston head 60. When hydraulics are forced into the area 68 within the hydraulic cylinder 105 the piston head 60 is forced outward thereby moving the piston 100. When the hydraulics are withdrawn from the area 68 the piston head 60 and associated piston

100 can contract. Contraction can also occur when the force on the piston 100 exceeds the hydraulic force found within area 68. It is at that time that the present invention engages and prevents undesired contraction of the piston 100 into the cylinder 105.

In the "disengaged" position shown in FIG. 3, the locking pin 40 is in its "closed" position so that the locking pin 40 prevents the teeth 22 of the cam 20 from engaging the piston 100. In this position, the quick-release cam lock may freely slide linearly in either direction along the piston 100. In the "released" position shown in FIG. 6, the radial groove 44 of the locking pin 40 aligns with the tail 21 of the cam 20. The coil spring 30 is biased so that in such a position, the spring 30 provides tension so as to rotate the cam 20 so that teeth 22 engage the piston 100. This spring actuated engagement freely allows linear movement of the quick-release cam lock or the piston 100 in one direction while restricting movement in the direction of compression of the hydraulic cylinder/piston arrangement.

In the preferred embodiment of the invention, the tubular body 1 is made of a metal such as aluminum and is generally machined to provide a relatively smooth surface. Such other parts as described above preferably may be made of a hardened steel of types generally known in the field. An inwardly offset annular lip 110 is located just inside of mounting face 7 and corresponds to and receives the cylinder lip 112. The locking screws 11 pass through the tubular body 1 and engage the cylinder lip 112 as it rests on annular lip 110. This provides for the mounting engagement of the present invention to a hydraulic cylinder/piston arrangement.

As is apparent from the foregoing description, the present invention provides the locking mechanism for securely fixing the relative position of a hydraulic cylinder and piston. Obvious modifications will occur to those skilled in the art without departing from the scope of the invention, and as such the invention is not to be limited to the specific preferred embodiment claimed herein. While the present invention has been described most specifically as being used as a locking mechanism in a hydraulic cylinder and piston type arrangement, it is clear that possible other embodiments of the quick-release cam lock could be used for securely positioning two telescoping tubular members of any sort and the foregoing disclosure is in no way meant to limit such potential uses.

What is claimed is:

1. A quick-release cam lock comprising:

a substantially tubular body having a slotted portion;

a camming means rotably attached to said tubular body within said slotted portion of said tubular body; and, a locking means for selectively locking said camming means.

2. The quick-release cam lock of claim 1 wherein said camming means includes a cam having a plurality of grooved teeth.

3. The quick-release cam lock of claim 1 wherein said locking means is a locking pin.

4. The quick-release cam lock of claim 3 wherein said camming means has a tail and said locking pin has a groove such that said tail of said cam is selectively engageable with said groove of said locking pin.

5. The quick-release cam lock of claim 1 further comprising a biasing means for selectively activating said camming means.

6. The quick-release cam lock of claim 5 wherein said biasing means is a coil spring, said coil spring having a first end proximate said tubular body and a second end proximate said camming means.

7. The quick-release cam lock of claim 1 further comprising at least one locking screw, said locking screw matably engageable to said tubular body.

8. The quick-release cam lock of claim 5 wherein said one or more locking screws selectively engage a hydraulic cylinder.

9. A quick-release cam lock comprising;

a substantially tubular body having a slotted portion;

a cam having grooved teeth, said cam rotatably attached to said tubular body within said slotted portion of said tubular body;

a coil spring having a first end proximate said tubular body and a second end proximate said cam; and, at least one locking screw passing through and threadably engaged to said tubular body.

10. The quick-release cam lock of claim 9 further comprising a locking means for selectively locking said cam.

11. A quick-release cam lock for hydraulic cylinders/piston apparatus comprising:

a substantially tubular body releasably mounted on said hydraulic cylinder, said body having a slotted portion;

a camming means rotably mounted to said tubular body within said slot;

a locking means for selectively locking said camming means.

12. The quick-release cam lock of claim 11 wherein said camming means further comprises grooved teeth mounted thereon, such that said teeth can directly engage said piston and any retraction of said piston into said cylinder causes said camming means to more firmly engage said piston while still allowing extension of said piston without interference.

13. The quick-release cam lock of claim 11 further comprising: a biasing means for said camming means maintaining said cam in direct contact with said piston unless prevented by said locking means.

14. The quick release cam lock of claim 11 wherein said tubular body is releasably mounted such that at least one locking screw passes through and threadably engages with said tubular body.

15. The quick release cam lock of claim 11 wherein said biasing means is a coil spring having a first end proximate said cam.

* * * * *